Nov. 19, 1957     T. W. WINSOR     2,813,525
DIGITAL PLETHYSMOGRAPH
Filed Feb. 18, 1953
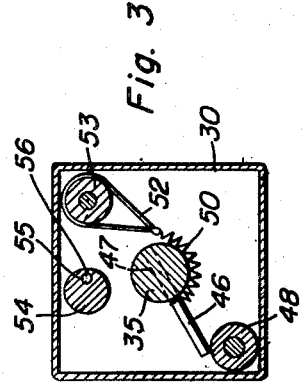
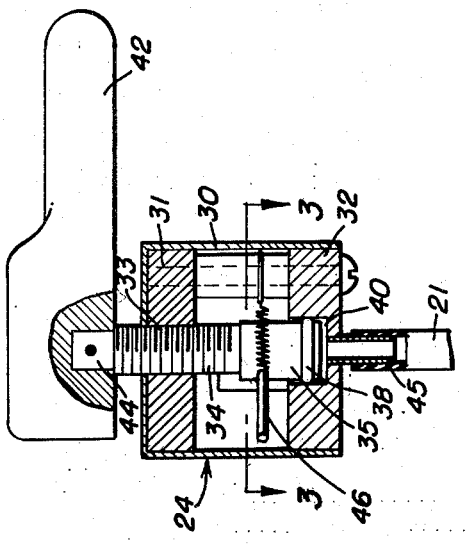
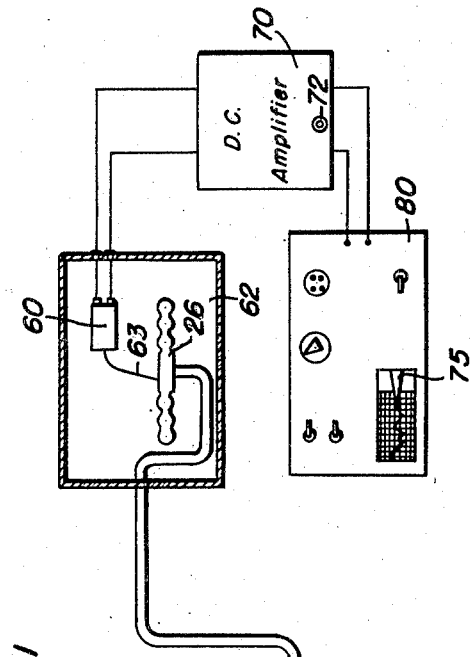
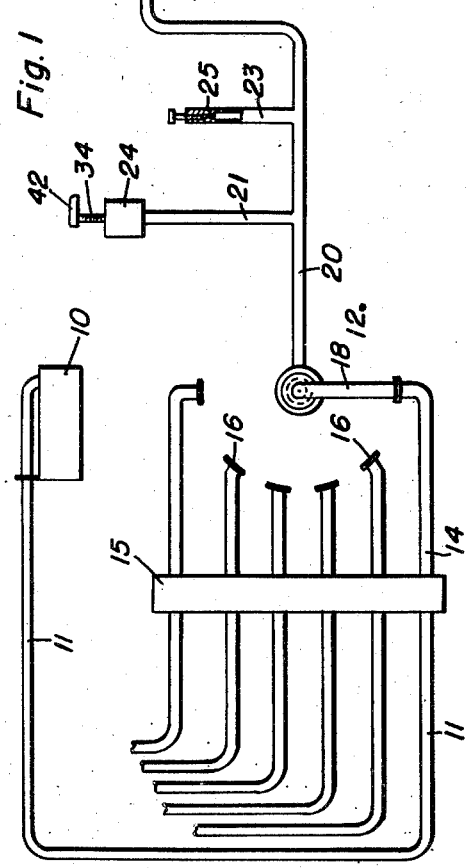
Travis W. Winsor
INVENTOR.
BY *[signatures]*
Attorneys

United States Patent Office 2,813,525
Patented Nov. 19, 1957

2,813,525

DIGITAL PLETHYSMOGRAPH

Travis W. Winsor, Los Angeles, Calif.

Application February 18, 1953, Serial No. 337,468

8 Claims. (Cl. 128—2.06)

This invention relates to plethysmography and especially to instruments registering or indicating the variations in size of the dilatations of a limb or organ of the body, which instruments are used for the recording of the rhythmic pulsatile dilatations and constractions produced as a consequence of the systolic and diastolic pressure variations occurring in the blood stream during a pulse cycle, or during any part thereof. The invention is more particularly related to those plethysmorgraphic instruments in which the dilatation of a digit of a human or non-human animal for the purpose of diagnosis is registered or recorded.

The construction of a sufficiently sensitive plethysmographic instrument and of similar instruments based on dilatation of a limb is beset with many difficulties, as the pressure variations are small and their frequency is sufficiently high to exclude mechanical transmission by members having inertia. Further, the diagnostic purpose requires an exact analysis of each variation within the pulsation cycle with respect to its time of occurrence, to its amplitude, etc.

The pressure in this case cannot be determined, by applying an external or extraneous pressure as this would influence, slow down or even stop the blood circulation during a part of this cycle, and especially during the measurement, so that the method used in connection with instruments which determine the pressure at a given moment only, is excluded.

Further, the sensitivity range which is necessary for diagnostic purposes varies considerably for different applications, and it is therefore of major importance to be able to adjust the instrument to the proper sensitivity range.

The best method so far devised which does not interfere with the variations of the blood pressure at the place at which measurement is made is of the photometric type and is based on photographic pictures made during pulsations. The sensitivity of this methid, however, is still relatively low, although it is higher than that of other methods which have been proposed.

This invention intends to replace this indirect measuring method by a method in which the pulse variations are directly detected and produce mechanical and electrical oscillations which, after amplification, directly act on a recording member, such as a stylus which makes a record of the variations of volume or pressure which is so spread along a time axis that also very short timed pulses are recorded, thus permitting an exact anlysis of the variations for diagnostic purposes.

The general object of the invention is to provide an instrument of the type above indicated which is more sensitive than the instruments heretofore constructed and used, and which is, therefore, of a higher diagnostic value.

It is therefore a main object of the invention to replace the method of producing pulsation records indirectly by a methd in which the writing instrument is influenced directly over an electrical transducer, the pulsation being transmitted to the transducer over a closed pneumatic or fluid system, while the transducer converts the oscillations so received into electrical oscillations which, after amplification, operate a writing implement.

It is a further main object of the invention to provide an instrument which is of a great sensitivity range, within which the sensitivity to be applied to an individual measurement may be selected in accordance with prevailing conditions.

It is a further object of the invention to provide an instrument in which the pulsatile dilatations and/or contractions of a digit are transmitted to a writing implement, recording them currently on a record strip, said dilatations and/or contractions being first transmitted to an oscillatory mechanical member connected with an electrical transducer, the latter transforming them with a high fidelity of translation into electrical oscillations which actuate the writing implement recording said oscillations on the record strip.

A further object of the invention consists in producing an instrument in which the pulsatile variations produced in a digit in their turn produce volume variations in a closed chamber surrounding the digit and are then transmitted through a pneumatic system to a movable member which is thus directly influenced by the pulsatile variations, the said member being connected with an electrical transducer translating the mechanical pulsations into electrical oscillations.

A further object of the invention consists in making said pneumatic system, transmitting the pulsations to the movable member, adjustable.

A further object of the invention consists in providing means for connecting said pneumatic system which contains an oscillatory member responsive to volume or pressure variations with a plurality of closed chambers associated with the digits to be examined so that after a preparatory adjustment of the closed chambers on the digits of the subject to be examined, said pneumatic system and recording equipment of the instrument may be connected electrically with any one of said closed chambers.

A number of ancillary and more specific objects of the invention will be described in the following detailed specification. The invention is illustrated in the accompanying drawings showing one embodiment thereof in a purely diagrammatic manner. It is to be understood that the embodiment shown in the diagram has been selected in order to explain the principle of the invention and the best mode of applying the principle. It will, however, be obvious that the constructive arrangement shown in the diagram is not part of the essence of the invention and may be changed without departing therefrom.

In the drawings.

Figure 1 is a diagram of the plethysmograph showing the general arrangement of the parts thereof;

Figure 2 is an elevational sectional view of the standardization chamber which is used in connection with the pneumatic system for adjustment purposes;

Figure 3 is a sectional plan view through the standardization chamber, the section being taken along line 3—3 of Figure 2; and Figure 4 is a view of the record strip on which the curve representing the pulsation has been inscribed.

A pneumatic system according to the invention includes the digit cups 10 or other oscillometric cups or cuffs which are tightly fixed on the digits or other body organs which are pulsating by means of some sealing compound in such a manner that the blood circulation is not restricted or partially cut off. These cups 10 are connected by means of air-tight flexible air conduits or tubes 11 with a selector valve generally indicated at 12.

A number of cups 10 and flexible tubes 11 may be used if the apparatus is arranged for connection with a patient's or subject's fingers, in order to make a record of pulsations in all fingers, for instance, which have a diagnostic importance, eight cups being frequently used in such a case.

The flexible tubes 11 are joined to rigid tubes 14 held in a junction box 15 which rigid tubes, as diagrammatically indicated in Figure 1, have open ends 16, each of which is capable of being joined in an air-tight manner to a rotatable tube 18 of a selector valve 12. The rotatable tube 18 is turned by the operator and is joined to any one of the tube ends 16 which the operator selects.

It will be understood that the drawing is diagrammatic and that the selector valve may comprise a rotatable cylinder or cone with a channel diagrammatically represented by the tube 18 and such a cylinder or cone may rotate within a valve housing with a plurality of channels which are indicated in the diagram by the tubes 14, which channels may, alternatively, be brought into operative connection with channel 18 in the cylindrical or conical body of the valve.

The channel 18 is in permanent connection with the tube 20 which communicates with a standardization chamber 24 and with the vent valve 25 and with a diaphragm box or bellows 26.

The diaphragm box or bellows 26 are of the usual conventional construction, such as used for registering pressure differences, and they will expand when the pressure within the pneumatic system of which the bellows forms a part increases, and they will contract or move inwardly when the pressure in the system decreases. The pneumatic system, it will be easily understood, is formed by the cups 10, the tubes 11, the tube 14, the rotatable valve or tube 18, the tube or pipe 20, the branch tubes 21 and 23 leading to the standardization chamber and vent valve, respectively, and the bellows 26.

The standardization chamber 24, the function of which will be explained below, consists of a small container 30, Figure 3, with a top and bottom plate 31, 32, respectively, the top plate being provided with a bore having very exactly cut threads 33 which engage the screw threads of a plunger rod 34. The plunger rod carries a plunger 35 which may be provided with a sealing ring 38 tightly fitting into a cylindrical bore 40 provided in the bottom plate 32. The plunger 35 moves up and down within the cylindrical bore 40 when rotated. Such rotation may take place by means of a handle 42 attached to a projecting head stud or pin 44 on the threaded plunger rod 34.

The cylindrical bore 40 is connected with a short sleeve or tube 45 which projects from the container and which connects the cylindrical bore 40 with the system. On the cylindrical tube 45, the tube 21 leading to the standardization chamber may be fixedly held.

The plunger 35 may, of course, also be ground into the bore 40 with such precision that it is air-tight and that no special sealing means 38 is necessary.

The plunger 35 carries a pin 46 held in a transverse bore 47 which projects outwardly from the upper end of the plunger. The pin 46 serves as a stop for the movement of the plunger and determines the end positions of the plunger and rod when the latter is rotated. One of these end positions may be fixed by means of the pillar 48 which consists of a cylindrical sleeve mounted on a bolt which is held between the top and bottom plates 31 and 32 of the container. The pillar 48 is so placed that the pin 46 rests upon the surface of the pillar in the position of the plunger which corresponds to its original position, or position of rest.

The projecting pin 46 is drawn against the stop formed by the pillar 48 by means of a coil spring 50, one end of which is fixed on the projecting pin 46 while the other end is connected with a loop 52 which is passed around a second cylindrical pillar 53 arranged on the other side of the plunger and plunger rod. The coil spring 50 encircles the plunger rod 34 by virtue of the attachment of its end to the pin 46, and, by virtue of the tension which is given to the spring, the plunger rod is biased so that the pin is firmly applied against the pillar and is held in this position.

A second stop is provided which consists of a cylindrical sleeve 54 which has a bore 55 eccentrically arranged within the cylinder through which a bolt 56 passes. The bolt is again held between the top and bottom plates 31 and 32 of the container. By adjusting the position of the cylindrical sleeve 54, the extent of the movement, permitted to the pin 46 and to the plunger rod 34 upon rotation of the handle, is adjusted. The bolt 56 may be connected with the cylindrical sleeve 54 and the bolt may pass through the top or the bottom plate and may be provided with means (not shown) for adjusting the position of the cylindrical stop 54. Obviously, if the stop 54 is moved in a counter-clockwise direction, this reduces the angle through which the stop pin 46 may move before being arrested by the stop upon turning of the handle 42.

The bellows 25, which may be of any suitable type, are enclosed together with the transducer 60, within a box 62. The transducer 60 may be of the crystal type, or of any other type adapted to translate a mechanical impulse into an electrical oscillation. The bellows 26 and the transducer 60 are shown as being mechanically connected by means of a translator wire or rod 63 which operates the movable element of the transducer according to the pulses which are produced by the alternative expansion and contraction of the bellows.

The electrical side of the transducer, which is in itself a well known unit, is connected with the D. C. high gain amplifier 70 transmitting the amplified pulses to a scriber of a recording unit. As many apparatuses of this type are known, and there is no specific peculiarity of such an apparatus required for the instrument according to the invention, the transducer amplifier, scriber or recorder is only diagrammatically indicated. One of the many apparatuses which is designed for frequencies approximating those of the heart beat, for example, is described in Patent No. 2,273,532.

The gain of the amplifier in this case is adjustable, for instance by a knob, which is indicated at 72. A calibrated attenuator may be used which will produce fixed value sensitivity changes for every step of the attenuation.

The operator, when using the instrument, fixes the cups or oscillometric cuffs 10 on the digits or other limbs of the subject by means of a sealing compound. Preferably, before using the instrument, he adjusts all the cups on the digits which he wants to investigate and then selects the proper cup by means of the selector valve 12. This cup surrounding the digit to be investigated is coupled with the pneumatic system when the channel 18 is connected with the end 16 of the tube leading to the cup in which the digit under investigation is held.

The pneumatic system is complete when the movable channel 18 of the selector valve has been moved to a position in which it is in connection with a tube 14 leading to the cup containing the digit under investigation. This system then consists of the cup 10, the duct 11, the channel 14, the movable channel 18, the pipe 20 and the bellows 26, and it further consists of the branch sections 21 and 23 connecting the standardization chamber 24 and the vent valve 25 with the pipe 20.

The standardization of the instrument sensitivity is made with the part under investigation in its proper place and with all members and parts in their operative position. This standardization is performed by adjusting the gain of the amplifier by means of the knob 72. The volume of the standardization chamber is decreased by a known amount by turning the handle 42, thus moving the plunger 35 downwardly. The decrease of the volume of the chamber produces a decrease of the volume of the entire pneumatic system.

The gain of the amplifier may be so readjusted that equal deflections of the recording stylus 75 will correspond to equal variations of the volume. For instance, for every 1 mm. cube change, a stylus deflection of 8 mm. is produced, which is an average result obtainable by the instrument in accordance with the invention.

None of the instruments heretofore used can produce a record of equal sensitivity and all records made with the present methods produce deflections or changes which are only approximately one-eighth to one-tenth of the deflection which is obtainable by the instrument according to the invention. This means that on a record such as shown in Figure 4, the amplitude of the curve would be only one-eighth to one-tenth of the one which is accurately shown in Figure 4. It will therefore be obvious that for diagnostic purposes, the results obtainable by this instrument according to the invention are far superior to the results obtainable with other instruments, so that the instrument according to the invention may be used in many cases in which such a use would not lead to the desired results in connection with instruments now in use.

Further, the pressure versus volume relationship is much more favorable in the instrument according to the invention than in any other known instrument.

In addition, the flexibility of the adjustment of the sensitivity is very great and in combination with the calibrated attenuator, it is thus possible to obtain in an extremely simple way all desired values.

The vent valve 25 is operated to equalize the pressure outside and the pressure within the system, thus adding to the precision of the instrument.

One of the many advantages of the instrument is the fact that a visible record, such as shown in Figure 4, is obtained, permitting one to identify a very small variation and the exact time at which it occurred, down to a fraction of one-hundredth of a second; it is also possible to determine the exact duration of such short pulsations with the instrument according to the invention.

It will be clear that changes of an unessential nature may be made without in any way departing from the essence of the invention as defined in the annexed claims.

Having described the invention, what is claimed is:

1. A plethysmographic recording system comprising a cup shaped to enclose that portion of the body the dilatation of which is to be recorded, said cup forming a closed chamber, a pneumatic system joined to said cup and including an oscillatory membrane member responsive to air pressure fluctuations within said system, means for translating the mechanical oscillations of the oscillatory membrane member into electrical oscillations, adjustable means for amplifying and for recording said electrical oscillations, including a variable and adjustable gain amplifier, a standardization chamber with a movable member adjusting the volume of air in the pneumatic system, inserted between said cup and the said oscillation membrane member, said volume adjustment bringing the pressure variations within the pneumatic system into direct proportional relation to the recorded oscillations.

2. A plethysmographic recording system as claimed in claim 1, with a plurality of cups each forming a closed chamber, a plurality of ducts each connected with one of said chambers, and a selector valve arranged in the pneumatic system connecting one of said ducts with that portion of the system which is joined to the oscillatory member.

3. A plethysmographic apparatus for recording the dilatations and/or contractions of a digit on a recording strip by means of a recording scriber, comprising a pneumatic system, including a digit cup forming a closed chamber adapted to be mounted and sealed on the digit, a flexible tube joining said cup with a fixed tube, provided with a branch pipe, a standardization chamber connected with said branch pipe, said standardization chamber being provided with means for producing a predetermined change of volume within the pneumatic system, an oscillatory member connected with the pneumatic system and oscillating in accordance with the fluctuations within the said system, means responsive to mechanical oscillations for translating the said oscillations into electrical current oscillations and means for recording said current oscillations, said last named means including the recording scriber.

4. In a plethysmographic apparatus as claimed in claim 3, a plurality of digit cups, each forming a closed chamber, and each connected with a tube, a selector valve with a rotatable member containing a channel adapted to be brought into air-tight connection with any one of the tubes by the operator, and a common duct leading from said rotatable member to the oscillatory member.

5. In a plethysmographic apparatus as claimed in claim 3, a standardization chamber comprising a container with a cylindrical bore, joined to the said branch pipe leading to the pneumatic system, a rotatable plunger tightly fitted into said bore, means for manually rotating said plunger and means for advancing said plunger within the cylindrical bore when rotated, to reduce the volume under the plunger by a predetermined value upon rotation through a predetermined angle.

6. A plethysmographic apparatus as claimed in claim 5, wherein said container is provided with a top and bottom plate, the latter being provided with the cylindrical bore for the plunger, the former being provided with a threaded bore, a plunger rod connected with said plunger reaching outside and provided with threads engaging the threads of the bore in the top plate, a handle attached to the plunger rod on the outside, a stop pin connected with said plunger rod and stops arresting the plunger rod in predetermined positions.

7. A plethysmographic apparatus as claimed in claim 5, wherein the plunger is provided with a plunger rod and a stop pin, spring means wound around said plunger for biasing it in one direction, and two arresting stops for said stop pin cooperating with said stop pin, one of said arresting stops being adjustable, the plunger rod and plunger being moved against the spring action and being biased to return into one predetermined stop position after having been manually rotated.

8. A plethysmographic instrument as claimed in claim 3 wherein the oscillatory member includes a bellows with a hollow interior connected with the pneumatic system, one of the movable end plates of the bellows being mechanically connected with the transducing means for translating the mechanical oscillations into electrical oscillations by a wire element.

References Cited in the file of this patent

UNITED STATES PATENTS

| | | |
|---|---|---|
| 2,139,509 | Marcellus | Dec. 6, 1938 |
| 2,297,905 | Luisada | Oct. 6, 1942 |